3,824,541

ANTI-THEFT DEVICE FOR BICYCLES AND THE LIKE

BACKGROUND OF THE INVENTION

1. Field of the Invention

This invention relates generally to anti-theft alarms and more particularly is directed towards an anti-theft alarm device for use on bicycles or the like.

2. Description of the Prior Art

Bicycle thefts have increased at an alarming rate, particularly in urban and suburban areas. Even locked bicycles are subject to theft since most locks readily yield to bolt cutters commonly carried by thieves. If the bicycle wheel is locked against rotation, a thief may use a truck or the like to carry away the bike. Thefts of this nature are successful primarily for the reason that they can be carried out quickly and easily and with little or no noise.

Accordingly, it is an object of the present invention to provide a novel anti-theft alarm for bicycles and the like. Another object of this invention is to provide an alarm for bicycles and the like which will produce a highly audible signal upon unauthorized movement of a bicycle that has been left in a parked position.

SUMMARY OF THE INVENTION

This invention features an alarm device for bicycles and the like, comprising a housing mountable in a predetermined position to the bicycle frame, a sound generating unit mounted to said housing, battery means mounted in said housing connected to said sound generating unit and a control circuit including mercury switches and a relay adapted to complete a circuit between the battery and the sound generating unit upon unauthorized movement of the bicycle. A key-operated arming switch is provided to disable the circuit during normal use of the bicycle and to arm the circuit when it is parked.

DETAILED DESCRIPTION OF THE PREFERRED EMBODIMENT

Figure 1:
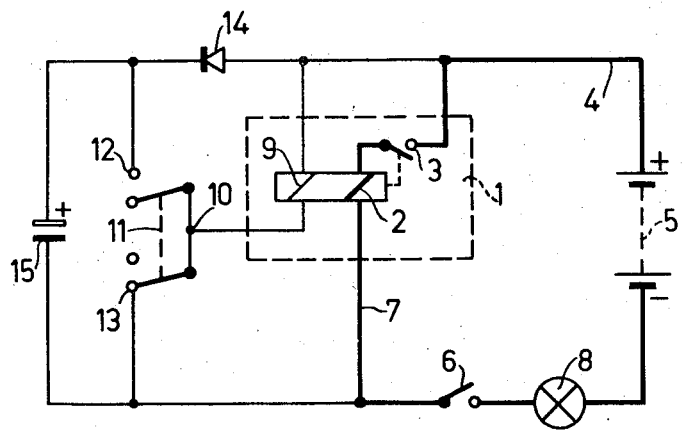
FIG. 1 is a view in side elevation of a bicycle equipped with an alarm device made according to the invention.

Referring now to the drawings, the reference character 10 generally indicates an anti-theft alarm device mounted to a bicycle 12. Preferably, the device 10 is mounted to a generally vertical frame member 14 by means of one-way screws threaded into tapped holes formed in the front face of the frame member 14, from within the device.

The device is generally organized about a housing comprised of a chassis 16 and a cover 18 detachably connected thereto. In the illustrated embodiment, the chassis 16 is formed with a back wall 20, top and bottom walls 22 and 24 respectively and a marginal flange 26 extending along the edges thereof. The cover 18 is a U-shaped piece having a front wall 28 and rearwardly extending side walls 30 and 32. The assembled housing is of a boxed configuration and preferably is fabricated from steel, aluminum or other suitable material of sufficient strength and rigidity to provide a rugged, durable enclosure. The illustrated housing is assembled by screws threaded to screw holes 34 in the cover 18 in register with screw holes 36 in the flange 26 of the chassis 16.

Mounted to the chassis 16 is a sound-generating unit 38 such as a SONALERT SC 628 sold by the Mallory Corporation. Such units produce a piercing, high frequency sound that is high audible over a wide area. In the illustrated embodiment the sound-generating unit 38 is mounted to the bottom wall 24 of the chassis with its neck 40 extending through a circular opening 42 formed in the bottom wall. In practice, the mouth of the unit is covered with a fine mesh grid 44 to prevent disabling the unit by insertion of tool against an internal diaphragm.

Also, mounted in the chassis 16 is a relay 46, a pair of batteries 48 and 50, a pair of mercury switches 52 and 54 and a pair of microswitches 56 and 58. The switches, batteries, relay and sound generating unit are connected by appropriate leads to be described in connection with the description of the circuit diagram. The mercury switches 52 and 54 are mounted in such a manner as to provide motion sensitivity about two coordinate axes so that the alarm will be actuated should the bike be tilted forwardly, rearwardly or to either side once it has been armed. The microswitches 56 and 58 are mounted to the top wall 22 with the actuator of the microswitch 56 depressed by the front wall of the cover 18 when it is in position. Similarly, the actuator of the microswitch 58 is maintained depressed by a screw secured in the hole 36 formed in the flange of the chassis. The microswitches are of the normally closed type that are kept open by the housing cover as long as it is kept in place and the screws holding the cover to the chassis are in place. It will be understood that this arrangement prevents tampering of the unit.

Mounted in the side wall 32 of the cover 18, is a lock switch 60 operated by means of key 62 and connected by leads 64 and 66 to the batteries 48 and 50 and to the mercury switches 52 and 54. The function of the lock switch 60 is to permit the circuit to be armed when parked and disarmed when the bike is to be used by the owner. Thus, whenever the bike is being ridden in a normal fashion, the switch 60 is locked open but when the bike is parked and unattended the switch is locked closed by the operator and the key removed. With the switch 60 closed, the circuit is armed and will be actuated upon unauthorized movement of the bicycle.

Figure 3:
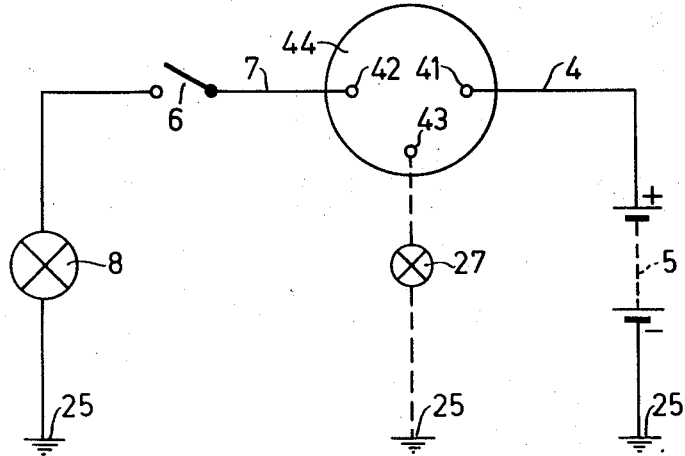

Referring now to the circuit diagram of FIG. 3, it will be seen that the circuit includes a lead 68 connecting the sound generating unit 38 to the batteries 48 and 50 which are in series with the lock switch 60. The mercury switches 52 and 54 and the microswitches 56 and 58 are connected in parallel across the lead 66 and a lead 70 which is connected by lead 72 to the coil of the relay 46 and also connected to both contacts 74 and 76 of the relay. A lead 78 is connected from the relay contact 74 to the sound generating unit 38 and a lead 30 is connected to the opposite end of the relay coil and to a lead between the batteries 48 and 50.

The circuit functions in the following manner. Under normal operating conditions, the switch 60 is kept open whenever the bike is being ridden by the owner. Under this condition, the circuit is open to the sound generating unit 38 which cannot be actuated regardless of the condition of the other switches. However, when the

United States Patent [19]
Schorter

[11] 3,824,542
[45] July 16, 1974

[54] ELECTRONICALLY CONTROLLED TWO-TERMINAL FLASHER UNIT

[75] Inventor: Bruno Schorter, Savigny-sur-Orge, France

[73] Assignee: U.S. Philips Corporation, New York, N.Y.

[22] Filed: Mar. 31, 1972

[21] Appl. No.: 240,190

[30] Foreign Application Priority Data
Apr. 9, 1971 France .............................. 71.12790

[52] U.S. Cl............................................. 340/81 R
[51] Int. Cl............................................. B60q 1/38
[58] Field of Search ....... 315/200 A, 210, 225, 226; 340/81 R, 81 F

[56] References Cited
UNITED STATES PATENTS
3,623,154   11/1971   Yonezu ............................ 340/81 F
3,673,564   6/1972   Kammerer ............................ 340/81

FOREIGN PATENTS OR APPLICATIONS
1,170,925   11/1969   Great Britain..................... 340/81 F

*Primary Examiner*—Donald J. Yusko
*Assistant Examiner*—K. Leimer
*Attorney, Agent, or Firm*—Frank R. Trifari; Bernard Franzblau

[57] ABSTRACT

An electronically controlled two-terminal automatic flasher unit for the directional signal lamps of a motor vehicle. The flasher unit includes an astable multivibrator with supply leads connected to a capacitor. The multivibrator alternately connects a relay energizing winding to each of the supply leads. A diode is serially connected with the capacitor across the two terminals of the flasher, as is a hold winding on the relay and a relay contact. The flasher unit can be installed without a change in the wiring system and can perform the vehicle alarm function.

11 Claims, 3 Drawing Figures

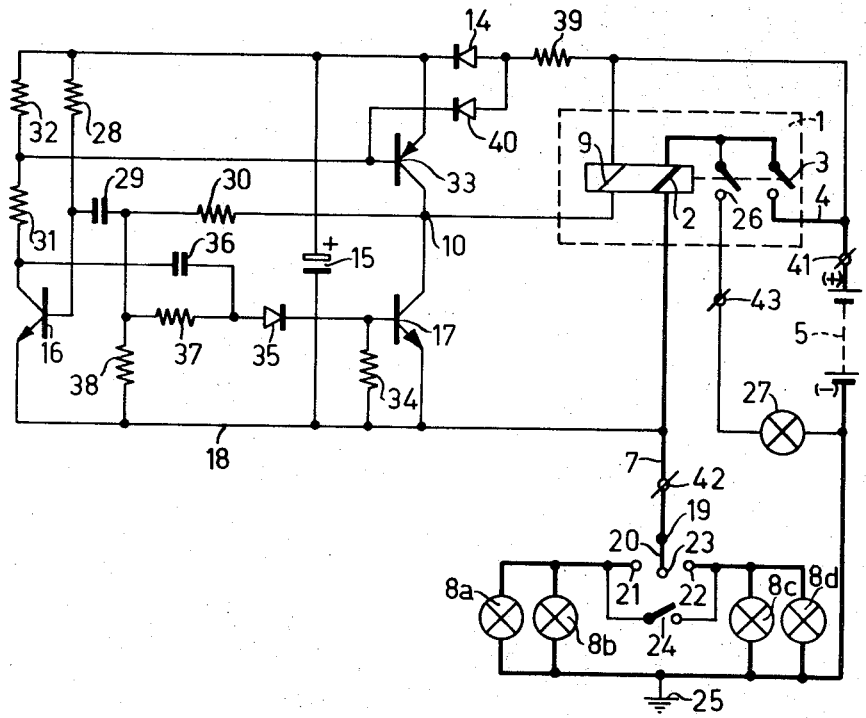

ELECTRONICALLY CONTROLLED TWO-TERMINAL FLASHER UNIT

The invention relates to an automatic flasher unit for lamps, preferably vehicle lamps for indicating a change in direction of the vehicle, which unit comprises an astable multivibrator which determines the flashing frequency and a relay having switch contacts which are to be connected in the lamp circuits.

Many electronic systems are known which are intended to replace the thermo-electrically controlled "hot wire" or bimetal systems which, in addition to uncertain reliability, have further disadvantages. They are unsuitable for performing the so-called distress or warning action in which all the direction indicating lamps flash simultaneously to indicate that a vehicle is in a condition of distress or emergency on the public highway. The reason for this is that the flashing frequency of a hot-wire system is directly linked to the current consumption and hence to the number of lamps burning, which in the distress condition frequently renders flashing impossible owing to the large amount of power consumed by all the lamps burning simultaneously. The known electronic devices cannot directly be substituted for the hot-wire systems because they have at least three terminals instead of two. This means that the astable multivibrator is continuously energized if a single three-position change-over switch is to be retained for controlling the flashing action, as is usual in motor cars. In the opposite case the control switch must have additional terminals to be connected to the voltage supply for the multivibrator circuit when the switch is in either of the operative positions.

It is an object of the present invention to realize a flasher unit which consumes no electric energy when the single-pole control switch is in the neutral position.

The invention further relates to a method of manufacturing an electronically controlled flashing system capable of replacing a thermally controlled system without the wiring having to be changed.

According to the invention an automatic flasher unit for lamps, preferably vehicle lamps for indicating a change in direction of the vehicle, comprises an astable multivibrator which determines the flashing frequency. The flasher unit includes a relay having switch contacts which are to be connected in the circuits of the lamps. The invention is characterized by an automatic flasher unit having only two terminals between which a first diode is connected in series with a capacitor and with the series combination of a make contact and a low-resistance holding winding of the relay. The multivibrator circuit has its supply leads connected to the capacitor and includes a change-over device which during the operation of the automatic flasher unit connects one end of a high-resistance energizing winding of the relay alternately to each of the supply leads. The other end of the energizing winding is connected to the one terminal to which the first diode also is connected.

Advantageously the relay has a supply contact for a pilot lamp.

Thus the system according to the invention may be directly substituted for a hot-wire or bimetal automatic flasher unit without any change in the existing change-over switch or the wiring, while its power consumption in the inoperative condition is zero.

An embodiment of an automatic flasher unit according to the invention will now be described, by way of example, with reference to the accompanying diagrammatic drawings, in which:

FIG. 1 is a circuit diagram showing the basic elements of an automatic flasher unit according to the invention.

Figure 2:
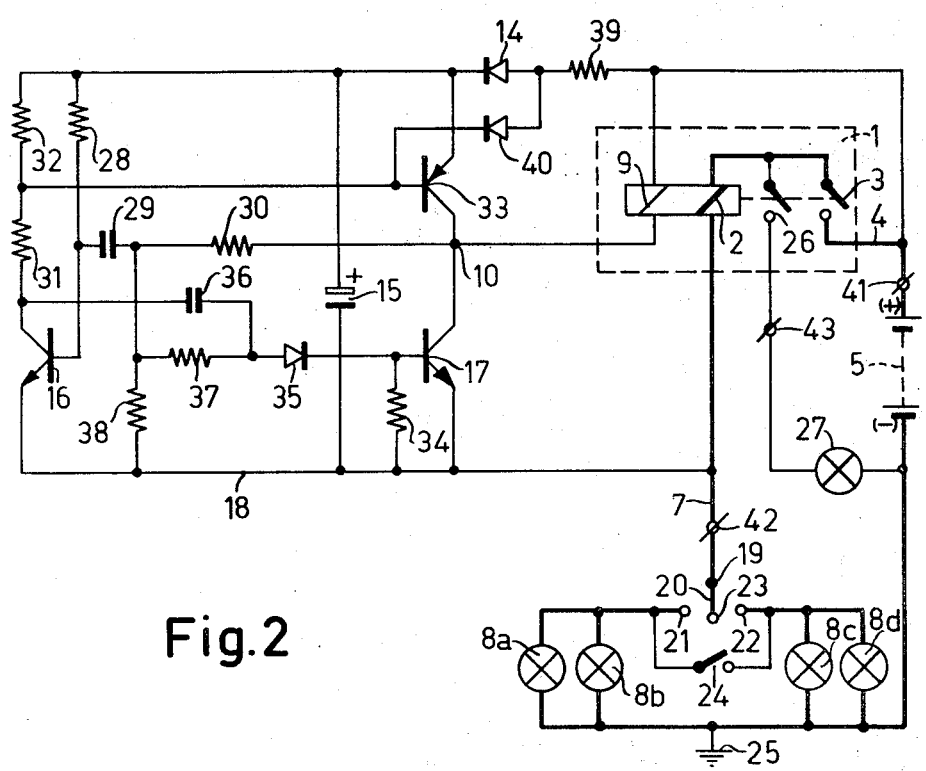
FIG. 2 is a view in perspective of an alarm device made according to the invention with the cover removed to show details of construction, and, FIG. 3 is a circuit diagram of the device.

FIG. 2 is the circuit diagram of an embodiment of the automatic flasher unit according to the invention, and FIGS. 3 shows diagrammatically the wiring of the automatic flasher unit according to the invention.

Referring now to FIG. 1, an electromagnetic relay 1 has a first energizing winding 2 which is in the form of a current coil and hence has a low resistance. One end of the winding 2 is connected to one of the poles of a make contact 3 of the relay 1, the other pole of which is connected by a lead 4 to the positive terminal of a battery 5. The other end of the winding 2 is connected by a lead 7 to one of the poles of a circuit breaker 6 to be operated by hand.

The other pole of the circuit breaker 6 is connected through an electric filament lamp 8 to the negative terminal of the battery 5.

A second energizing winding 9 of the relay 1, which is in the form of a voltage coil and hence has a high resistance, is connected at one end to the lead 4 and at the other end to the common point 10 of a change-over switch 11. The make contacts 12 and 13 of switch 11 are connected to the cathode of a diode 14, the anode of which is connected to the lead 4, and to the lead 7, respectively. The positive electrode of an electrolytic capacitor 15 is connected to the cathode of the diode 14 and its negative electrode is connected to the lead 7.

The operation of the basic diagram of FIG. 1 may be explained as follows: assuming that initially the change-over switch 11 is closed on the pole 13, closure of the manual circuit breaker 6 causes the capacitor 15 to be charged through the filament lamp 8 and the diode 14 to a voltage equal to that of the battery 5 less the voltage drop across the diode in its pass direction. Simultaneously the voltage winding 9 of the relay 1 is traversed by a current which flows from the positive terminal of the battery 5, through the said winding, the pole 13 of the change-over switch 11 and the lamp 8 back to the negative terminal of the battery 5. The relay then is energized, closing the make contact 3, so that the lamp 8 is lit via the low ohmic resistance of the holding winding 2. At this instant the voltage across the winding 9 becomes substantially equal to zero. However the relay 1 continues to be energized, because the supply current of the lamp 8 flows through the winding 2, which latter circuit is shown in heavy lines.

If the switch 11 then is changed over to the pole 12, the voltage winding 9 of the relay 1 is traversed by a current which is supplied by the capacitor 15 and, when the diode is cut off, flows from the positive electrode of the said capacitor via the pole 12 of the switch 11, the coil 9, the make contact 3 and the winding 2 to the negative terminal of the capacitor 15. This current, the direction of which is opposite to that of the current produced by the initial energization of the relay 1, produces a magnetic field in the winding 9 which acts in opposition to the self-energization field produced by the winding 2, and this causes the relay to be de-energized so that the make contact 3 is opened and the lamp 8 is extinguished. The capacitor 15 then is charged again to its initial charge via the diode 14 and the lamp 8, the voltage across the winding 9 becoming substantially equal to zero so that the circuit is ready for a new cycle.

Replacing the change-over switch 11 by two alternately conducting transistors which are cut off by an astable multivibrator circuit causes the flashing frequency of the lamp 8 to be determined by the repetition frequency of the said multivibrator.

In FIG. 2 in which elements corresponding to those of FIG. 1 are designated by like reference numerals, the multivibrator circuit comprises two *npn* transistors 16 and 17 the emitters of which are connected to a lead 18 which is connected to the lead 7 and a common terminal 19 of a single-pole switch 20 which comprises two make contacts 21 and 22 and a neutral point 23.

The make contacts 21 and 22 of the switch 20 are connected to a single-pole circuit breaker 24 and also to two groups of electric filament lamps 8a, 8b and 8c, 8d which are connected to ground 25 which corresponds to the negative terminal of the battery 5. The relay 1 has a second make contact 26 one pole of which is connected to the make contact 3 and the other pole of which is connected via a pilot lamp 27 to the negative terminal of the battery 5.

The base of the transistor 16 is connected through a resistor 28 to the cathode of the diode 14 and also through the series combination of a capacitor 29 and a resistor 30 to the collector of the transistor 17.

The collector of the transistor 16 is connected to he cathode of the diode 14 through two series resistors 31 and 32 the junction point of which is connected to the base of a circuit-breaker transistor 33 of the *pnp* type. The emitter of transistor 33 is connected to the cathode of the diode 14 and the collector is connected to the collector of the transistor 17. The common point is connected to one end of the winding 9.

The base of the transistor 17 is connected through a resistor 34 to the lead 18 and also to the cathode of a diode 35 the anode of which is connected via a capacitor 36 to the collector of the transistor 16. The junction point of the capacitor 29 and the resistor 30 is connected via a resistor 37 to the anode of the diode 35 and also via a resistor 38 to the lead 18.

The anode of the diode 14 is connected to the lead 4 via a current limiting resistor 39 and also to the anode of a blocking diode 40 the cathode of which is connected to the base of the transistor 33. A terminal 41 is connected to the lead 4 and the terminal 42 to the lead 7, a terminal 43 being connected to one of the poles of the make contact 26 of the relay 1.

The operation of the circuit arrangement shown in FIG. 2 may be explained as follows: the make contact 12 of FIG. 1 is constituted by the transistor 33 and the make contact 13 of FIG. 1 by the transistor 17. The transistors 16 and 17 form the active elements of the astable multivibrator, while the transistor 33 is controlled by the collector circuit of the transistor 16.

The circuit arrangement has two conditions in the first of which the transistor 17 is conducting and the transistors 16 and 33 are non-conducting, and in the second of which the transistor 17 is non-conducting and the transistors 16 and 33 are conducting. The duration of the conductive condition of the transistor 17 depends upon the current which is supplied through the capacitor 36 but is in any case longer than the time during which current flows through the winding 9 and hence longer than the response time of the relay 1. The time during which this condition is maintained depends upon the RC time which is determined by the resistor 28 and the capacitor 29.

The other condition, in which the lamps do not burn, has a duration which is dependent upon the value of the time constant of the resistor 37 in conjunction with the capacitor 36 and corresponds to the conductive condition of the transistors 16 and 33.

Initially relay 1 is deenergized, contact 3 is open and the lamps are extinguished. Capacitor 15 is charged via diode 14 from battery 5, assuming switch 20 is closed on either contact 21 or 22. Transistor 16 draws base current and is turned on. Transistors 17 and 33 are non-conductive. Common point 10 is connected to the positive supply voltage via winding 9 of relay 1. The extinction time is determined by capacitor 36 and resistor 37, after which diode 36 and hence transistor 17 conduct. Transistor 17 conducts via diode 35 and capacitor 36. Transistor 16 is now cut-off. Since transistor 17 conducts, the potential of common point 10 drops to a low value, thereby energizing relay 1 via the current flow in winding 9. Relay contact 3 closes and current flows to the lamps 8 via contact 3 and relay winding 2. Capacitor 36 is charged up. Resistor 28 and capacitor 29 determine the "on" time of the lamps. Finally, transistor 16 switches back into conduction, and so does transistor 33 since it is supplied with base current via transistor 16. Transistor 17 becomes non-conductive. Capacitor 15 then begins to discharge via transistor 33, winding 9, relay contact 3 and winding 2, thereby deenergizing relay 1, opening contact 3 and extinguishing the lamps 8. Diode 14 again conducts to replenish the charge on capacitor 15. Diode 40 conducts and cuts-off transistor 33. One complete flashing cycle has been completed. If switch 20 is placed on the neutral contact 23, capacitor 15 discharges via transistors 16, 17 and 33, returning the unit to the initial condition.

The cut-off voltage of the transistor 16 is limited by a voltage divider comprising the resistors 30 and 38, while the cut-off voltage of the transistor 17 cannot become negative owing to the presence of the blocking diode 35 connected to the resistor 34. These precautions are necessary because of the use of planar epitaxial transistors the maximum admissible base emitter voltages of which are lower than the value of the voltage of the battery 5.

The diode 40 ensures that the transistor 33 is cut off during the extinction period as soon as the relay 1 has become de-energized, the transistor 16 remaining conducting. For this purpose the diode 40 shunts the base current of the transistor 33. In order to cause the multivibrator to change state, the transistor 17 passing from the cut-off condition to the conducting condition, it is of importance that the impedance of the winding 9 is not shunted by the low impedance of the transistor 33 when conducting. Otherwise the negative variation of the potential between the collector and the emitter of the transistor 17 would be insufficient to control the cut-off of the transistor 16 and the multivibrator would not operate.

The resistor 39 serves to limit the charging current for the capacitor 15 which flows through the diode 14 and together with this capacitor also forms a filter for parasitic signals having steep leading edges which may occur on the supply lines and may interfere with the operation of the multivibrator.

PO-1050
(5/69)

UNITED STATES PATENT OFFICE
CERTIFICATE OF CORRECTION

Patent No. 3,824,642  Dated July 16, 1974

Inventor(s) BRUNO SCHORTER

It is certified that error appears in the above-identified patent and that said Letters Patent are hereby corrected as shown below:

IN THE TITLE below "Foreign Application Priority Data" cancel "71.12790" and insert -- 7112790 --;

Signed and sealed this 22nd day of October 1974.

(SEAL)
Attest:

McCOY M. GIBSON JR.
Attesting Officer

C. MARSHALL DANN
Commissioner of Patents